May 29, 1956 W. P. CHRISTOPH 2,747,284
DOUBLE IMAGE MICROMETER
Filed Feb. 25, 1955
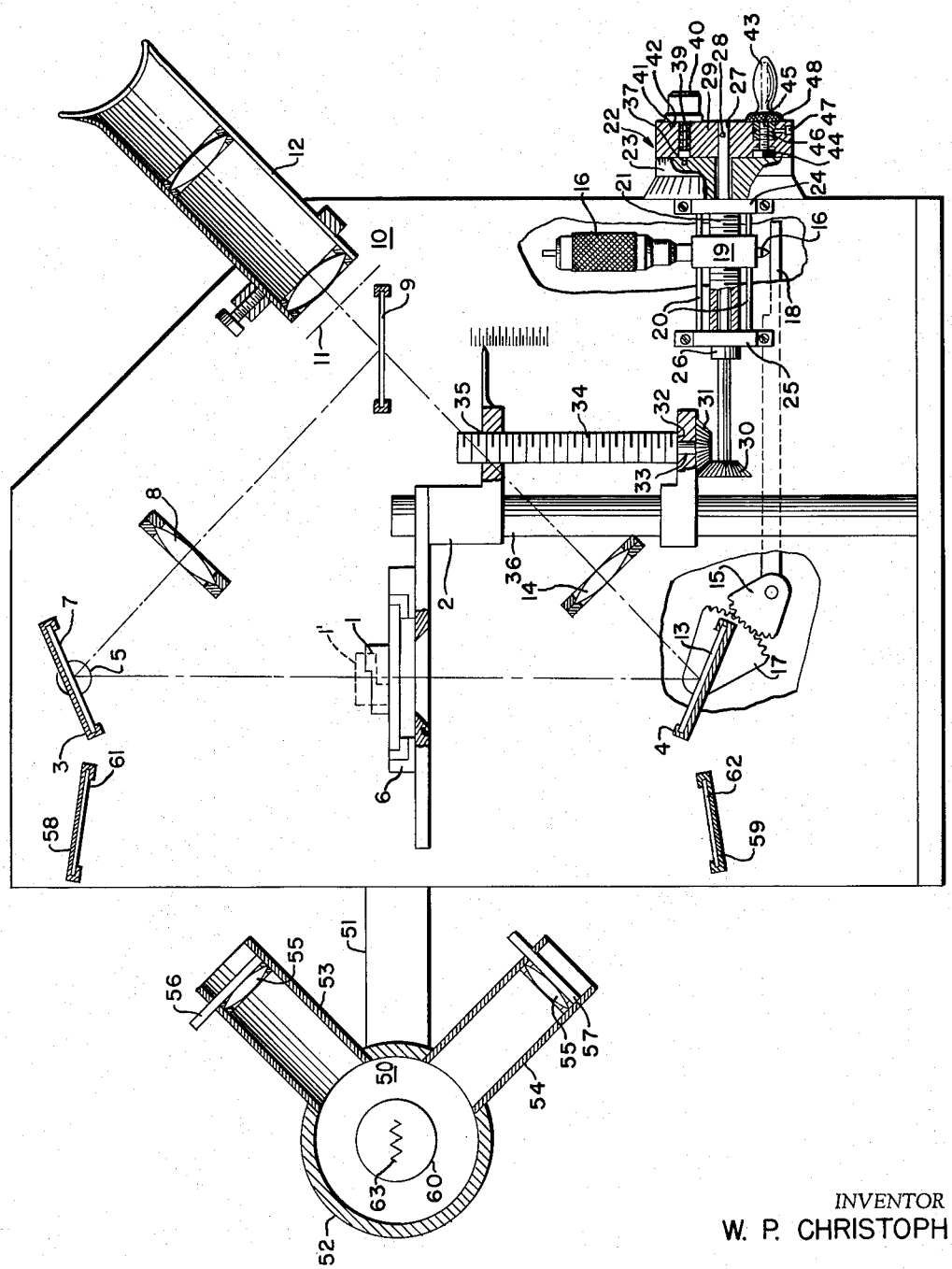
INVENTOR
W. P. CHRISTOPH
BY
ATTORNEYS United States Patent Office 2,747,284
Patented May 29, 1956

2,747,284

DOUBLE IMAGE MICROMETER

Walter P. Christoph, Riverdale, Md.

Application February 25, 1955, Serial No. 490,710

9 Claims. (Cl. 33—125)

(Granted under Title 35, U. S. Code (1952), sec. 266)

The invention described herein may be manufactured and used by or for the Government of the United States of America for governmental purposes without the payment of any royalties thereon or therefor.

This invention relates to an optical measuring and testing device and is more particularly concerned with an apparatus for obtaining the exact and direct measurement of the distance between a pair of visible marks disposed respectively on opposite sides of a non-transparent object. It utilizes a system of mirrors or prisms to obtain the projection to a reference plane of the distance between these marks and thereafter brings these two projected images into coincidence in correlation with a calibrated mechanical movement device. Prior systems of precision measurement of the character to which this invention is directed have utilized among other expedients, a traveling microscope for measuring the distance between each of the two marks or alternatively for obtaining the distance from a common reference mark to the marks of interest and thereafter subtracting to obtain the desired measurement. Alternate methods of the prior art have utilized apparatus for measuring the location of the various marks with respect to a reference mark on each side, whose mutual relationship had previously been determined. The common reference point in such systems may be in the nature of a hole, an edge, or a pin, and in the systems using two respective reference marks on either side of the object such characteristics as edges, steps or other definite marks on the block or the like which are peculiar to the configuration of the particular object are utilized. An additional prior art technique to achieve this specific purpose of measuring the distance between two marks on opposite sides of a non-transparent object embodies the use of turntables and specific jigs by which the object may be turned upside down or otherwise positionally inverted while maintaining a close relationship between the initial location of one mark in a reference plane perpendicular to the axis of rotation and the position to which the second point to be used is moved and thereafter measuring the distance between the first mark and the effective position by projection or rotation of the other mark on the opposite side of the object. This measurement as taken with respect to the aforesaid plane is accomplished by means of a travelling microscope or an ocular micrometer.

Certain disadvantages are inherent in each of the prior methods which result from the necessity of providing special reference marks with an accuracy often not necessary for the specific purpose. Furthermore, the possibility of errors entering into any system in which the object is required to be moved is greatly increased by an unavoidable movement and realignment of the object between the measurements and the multiple calculations. The increased time consumption of the measuring procedures of these prior systems and previously used techniques is itself well known and appreciated without additionally taking into consideration the preparation of reference marks and/or auxiliary equipment such as turntables and special jigs as required. Also the mental steps of calculating the final result are to some extent time consuming. These disadvantages of prior art systems are appreciably reduced or are substantially obviated by the double image micrometer of the instant invention which is a precision measuring device having the accuracy of the particular micrometer screw used therewith. It operates without the application of any mechanical pressure on the object, and further provides both a means of measuring the distance between points on opposite sides of an object, and/or determining the position of a point to establish an alignment with a given point remote therefrom on an opposite surface of the object. Moreover, it is well adapted to provide relationships for the measurement of angles which are maintained by proper marks on the upper and lower sides of the object. If desired, photographs may be taken by means of an added camera so disposed as to focus on the image plane presented by the optical system of the instant device. The general principles of the invention are basic and not limited by the factor of size for the application of the principles of the instant method although the instrument is preferably provided for measuring small distances which cannot be done by mechanical means and still maintain a high degree of accuracy of measurement thereof. The qualitative functions of the instant system utilize light from an electric light bulb, or a natural light source as desired. The light source may include a pair of light bulbs with one each for illuminating each side of the object, or may incorporate the system shown on the drawing utilizing a single lamp and pair of lenses which causes the light to impinge on a dual system of mirrors to provide lighting for the top and bottom surfaces of the object.

The apparatus is provided with a dual system of first surface mirrors for reflecting the beams respectively from the top and the bottom surfaces of the object to produce two real images in a common plane at a suitable reference point and after reflection by the mirrors. One of the mirrors is arranged to revolve about an axis corresponding to a line on the surface of the mirror in conjunction with which movement is effected by a calibrated micrometer device. Either the upper or lower mirror or both mirrors may be rotated. The instant embodiment to be described is directed to a preferred form in which the lower mirror is made adjustable.

The beams producing the two images are superposed in a beam splitter which provides a means of obtaining the two images to be measured from the two surfaces of the object in a common plane where they are viewed by a magnifying viewing system. Both of the aforesaid optical beams are in the same plane perpendicular to the axes of the aforementioned first surface mirrors.

One object of this invention resides in the use of two symmetrical optical beams for delivering a true image of a portion of the top and bottom of an object respectively and superimposing said images at a common image plane for visual viewing.

Another object of the invention is to provide an optical system for effecting precision measurement of the distance between visible marks on remote sides of non-transparent objects and obtaining a correlation therebetween without moving the object between measurements and thereby obviating any necessity for providing a common reference mark.

Another object of the invention resides in providing a measuring system which obviates many of the foregoing disadvantages of prior art systems while providing substantially all of the desirable characteristics of equipment heretofore or now in general use.

A further object of the invention resides in the provision of a system of optical apparatus for use in conjunction with a screw type micrometer whereby a direct reading is obtained for the projected distance between two points on remote surfaces of an object, and by which system a mark may be established at a given distance from a first mark by adjustment of the micrometer screw, the location of which mark is thus obtained in a simple manner and without requiring auxiliary turntables or special jigs.

Obviously other modifications and variations of the present invention are possible in the light of the above teachings. It is therefore to be understood that within the scope of the appended claims the invention may be practiced otherwise than as specifically described.

On the drawing is shown an optical micrometer in accordance with a preferred embodiment of the invention.

Referring now to the drawing, the optical micrometer assembly is indicated generally at 10. The object having points or marks or the like on opposite surfaces thereof, the relative displacement of which marks is desired to be measured, is positioned as shown at 1 with an alternative block shape shown in dashed outline at 1'. The object is carried by the supporting table assembly 2 of the micrometer assembly 10. This supporting table may advantageously utilize a mechanical stage or the like shown generally at 6, of the character used with microscopes, to facilitate placement of the object 1 in a manner such that the two marks fall along a line in a plane parallel to the drawing and coincident with a plane through the centers of the optical beam paths shown by dashed lines. Such a stage may be incorporated as a part of the table assembly 2 if desired and should provide mechanical screw adjustments for rotational, lateral, and transverse movements of the object to permit rapid initial positioning of the marks for viewing. Also it may incorporate angular calibrations for use in conjunction with cross hair reference lines in the optical viewing system for the measurement of the angular displacement with respect to a reference plane of a group of points on the two surfaces of an object. The light beams from the top and bottom surfaces of the object at 1 and including the opposed points to be observed are caused to impinge on the pair of substantially symmetrically disposed first surfaced mirrors 7 and 13 mounted respectively by the supports 3 and 4.

The mirror 7 as carried by the support 3, is normally fixed during operation of the system but is arranged to be moved about a pivotal mounting 5 to provide an initial alignment of the system. As aforementioned this mirror may be made the adjustable measuring one of the system without departing from the spirit or scope of the invention. Thereafter the upper mirror of the instant embodiment is locked in place by a screw and lock nut or other suitable structure not shown. The light beam rays impinging on the upper mirror 7 are reflected and brought into focus by an objective lens 8 to project on to the surface of a beam splitting device 9 which may be a half surfaced mirror or a prism arrangement, the half surfaced mirror being shown by way of example. This beam is so focused as to provide a real image at a focal plane shown for example at 11. This image of a point or mark on the top surface of the object at 1 is viewed through the magnifying optical system indicated generally at 12 and simultaneous therewith the image of a point or reference mark on the lower side of the object 1 is brought into focus at another point on the plane 11 in the case where the points on the object 1 are not initially in vertical coincidence. This beam path of light rays is symmetrical to that aforementioned, and includes the first surfaced mirror 13 carried by the mounting 4 and brought into focus at the image focal plane by the second objective lens 14.

This beam as focused by 14 contains the image of the lower surface and mark on the object 1. It passes directly through the beam splitting surface arrangement of the device at 9. If the points on the object being compared are not in coincidence and the mirror 13 is at substantially the same angle as mirror 7, the two images will be displaced in space by a distance proportional to the actual displacement thereof when referred by effective projection to a common reference plane, as the image plane 11 is viewed by the magnifying system 12. The mirror 13 is provided with a mechanical linkage to provide a 1 to 2 ratio of movement as shown for example to comprise gear segments 15 and 17 arranged for movement of the arm 18 attached to the lower segment 15. The segment 17 is pivoted about an axis on the center of the surface of the mirror 13 and the segment 15 pivoted through a bearing in the vertical support plate of 10, in a manner not shown, to provide movement of the lever arm 18 connected therewith. Movement of this lever arm 18 will function to reposition the lower mirror 13 and permit the operator to bring the two images into coincidence in a manner to be described.

The measurement of the angular displacement of the mirror 13 in terms of the linear displacement of the two points on the object along a common line is accomplished by a micrometer screw device 16 the movable point of which bears against the outer extremity of the rod 18 in a manner providing a relationship wherein the position of the micrometer along the shaft extension is such as to give a direct reading of the linear displacement of the two marks on the object when referred to a common symmetry plane. This measurement system for micrometer 16 includes a travelling nut or block 19 which carries the fixed bearing cylinder for the movable spindle of micrometer 16. The block 19 is arranged to be guided by the guide bars 20 and is in threaded mating engagement with the screw 21 which is fixedly attached to the inner knob portion 23 of the knob assembly generally indicated at 22. This knob 23 and screw 21 are carried by the bearing blocks 24 and 25 for rotation therein. The block 25 is additionally provided with a bearing surface at 26 for the shaft 27 which is concentrically disposed within the threaded shaft 21. This shaft is pinned as at 28 to the outer knob 29 of the assembly 22 in a manner to provide rotation of the beveled gears 30 and 31. Bevel gear 31 is carried by the bearing 32 and the shaft extension 33 of the threaded shaft 34. This shaft is threaded into the portion 35 of the support 2 and functions to move this support along the column 36 to provide elevational adjustment of the object at 1 as required for shifting the reference point vertically up or down until both reference points are equi-distant from a symmetry reference plane normal to the light beams between mirrors 7 and 13 and through the midpoint thereof, in a manner to hereinafter be described.

The knob 29 is provided with a detent arrangement or the like shown as comprising a detent 37 which is urged into a hole 38 by the spring 39. When the knob 40 is withdrawn outwardly the pin 41 is withdrawn from its hole 42 and the knob 40 may be rotated to maintain the detent out of engagement with the inner calibrated knob 23. This permits movement of the knob 29 by the crank handle 43 to position the support 2 as required. The crank arrangements at 43 include a pad 44 which engages a back surface of the knob 23 and carries a thread 45 which is engaged in a portion 46 of knurled nut 48 which is rotatable in knob 29. Nut 48 is retained against longitudinal movement as by a set screw 47. It is thus deemed apparent that the pad 44 may be withdrawn from engagement with knob 23 by rotation of nut 48, the crank rotated to position the object 1' on platform 2 in correlation with the plane of beam splitter 9. It may then be retightened to drive the inner knob 23 therewith with a common cranking motion of the handle 43 after the knurled locking nut 48 is rotated to reposition the pad against the knob 23. This free movement arrangement of the outer knob 29 without movement of the screw knob 23 as aforedescribed, conversely provides for a movement of the block 19 carrying the micrometer 16 by decoupled rotation of screw knob 23. This action, which may be utilized as an alternate method with the instant device where the dimensions of the object 1' are known may be accomplished only after the detent knob 40 is withdrawn and rotated to lift the pin 41 from the hole 42 therefor, and pad 44 is disengaged from knob 23. Normally the two knob portions 23 and 29 are locked together in a normal position by the detent 37 when the image points are on opposite surfaces of a very thin sheet of material.

However, when the object is of some appreciable thickness and irregular shape as shown in the case of the object 1' or where it is otherwise required to establish a relative positioning of the two points in a reference plane common to that of the beam splitter 9, the outer knob 29 may be rotated to lower the support table 2 as required to effectively bring the mid point between the lower and upper sides of the object into the reference plane. Thereafter the inner knob 23 may be rotated independently for calibration purposes while knob 29 is held, thereby to move the micrometer block 19 a predetermined distance along the screw 21 to compensate for the projected displacement of the point on the lower side of the object with respect to the common reference plane. Thereafter the clamp nut 48 is rotated to advance the pad 44 into engagement with the inner surface of knob 23. The images of the two points then appear to be displaced at a linear distance at the focal or image plane 11 and the micrometer 16 is rotated to bring the two points into coincidence. The reading taken on the micrometer then represents the displacement of these two points along a common line in a given reference plane. Alternatively and by the preferred method of operation of the device, the two knobs 23 and 29 may be locked together after the initial positioning of the point on one side of the object in the reference plane, and the table and micrometer moved until both points of interest on the object 1' are in focus at plane 11, and the displacement in this reference plane measured by micrometer screw 16.

An illuminating system for aiding in the observation of the two sides of the object 1 is generally indicated at 50. It comprises a lamp house 52 carried by a support 51 which may advantageously be affixed to the plate structure of 10.

The lamp house 50 is provided with two divergent barrels or tubes 53 and 54 which carry the condensing lenses 55 and may retain the gass filters 56 and 57 of different colors as an aid in distinguishing the two different surfaces of the object 1.

The light beam from the filament 63 of lamp 60 is projected as a diffused beam by the lenses 55 to impinge on the mirrors 61 and 62 which may be adjusted by their respective holders 58 and 59 to reflect light rays to illuminate the object, thereby providing a source of diffuse light for reflection by the mirrors 7 and 13 for viewing at the magnifying optical system 12.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An optical measuring system for providing a direct measurement of the projected linear distance between two points on opposite surfaces of an object as referred to a common reference plane which comprises, means providing a pair of symmetrical optical paths including in each path a first surface mirror and means for focusing the images reflected thereby, a vertically movable support for said object having means thereon for orientation of the object, said optical path means including a beam splitting device disposed in the plane of symmetry of said pair of optical paths for providing for the focusing of the beams of respective ones of said pair of optical paths in a common image focal plane thereby to provide reflection and projection respectively for each of the marks on the opposite faces of an object to said image focal plane for viewing, measuring means coupled to at least one of the first surface mirrors of said pair of optical paths and including means for providing rotation of said coupled mirror, means connected to said coupled mirror through said mirror rotating means for providing movement of the mirror for repositioning of the image of one of said marks at the image focal plane into a coincidence with the image of the other of said marks, said support having calibrating means for providing a correlation of the movement of said support with the rotation of said movable mirror, said last named means being operatively connectable to said mirror rotating means and selectively disengageable therefrom for independent movement of said support.

2. In a double image micrometer device of the character described for measuring the projected distance between a plurality of marks on opposite surfaces of an object, in combination, supporting means for positioning the object thereon in a predetermined orientation, means for providing movement of said support to position the points on the object a predetermined distance from a reference symmetry plane, means including a beam splitting device located in said reference plane, and for providing a pair of symmetrical optical beam paths, said beam paths being disposed to provide reflection and projection respectively of each of a plurality of marks on the opposite sides of the object to a reference focal plane for viewing, means in each of said optical paths for simultaneously focusing both of said marks, means for bringing said marks into visual coincidence and focus at the focal plane, an optical magnifying system providing for viewing the coincidence or relative displacement of the plurality of marks at the focal plane, calibrated means for providing movement of an image beam in one of said optical beam paths, said calibrated means including an indicating device coupled to said coincidence means for providing a measured indication of the displacement between said marks as the pair of images in each of said paths is brought from a displaced position into coincidence at said focal plane by movement of said indicating device.

3. A double image micrometer comprising a means for supporting an object having a plurality of marks thereon with one each on opposite surfaces thereof, means for orienting the object on the supporting means, said supporting means including a calibrated drive for positioning the object in predetermined correlation with a reference plane, means including a beam splitter for providing a pair of substantially symmetrical optical paths, means for focusing the images of the marks from each optical path in a common focal plane, means for viewing the images at said focal plane, means to provide a displacement of the beam of one of said optical paths whereby the images of the marks in the respective optical paths are brought into coincidence before said viewing means, and means movable in correlation with said displacement means for providing a measurement of the movement thereof.

4. The structure of claim 3 further characterized by means for providing a movement of said measuring means in correlation with the vertical displacement of said object by said support whereby to shift the object and bring the marks of an irregular shaped object into equidistant spaced relation from the reference plane and the plane of the beam splitter.

5. An apparatus of the character of claim 4 further including a calibrated micrometer spindle and screw assembly for providing a calibrated measurement of the projection of the displacement of said marks on the object after providing coincidence of said marks in the image plane.

6. The structure of claim 5 wherein each of said symmetrical optical beam paths includes a first surface mirror, said beam displacement means for the first surface mirror of one of said optical beam paths having a pair of interengaging gear segments to provide a correlated movement thereof with movement of said micrometer screw and spindle assembly.

7. The structure of claim 6 further characterized by means for shifting the point of engagement of the spindle of said micrometer assembly with respect to the displacement means for one of said pair of gear segments.

8. A direct reading optical measuring instrument comprising an optical system including means including a beam splitting device for providing two substantially symmetrical optical beams from an object to a focal plane in said system, means for supporting said object in a manner whereby the object is disposed in the symmetry plane of said beam paths, a viewing system including a cross hair means, a settable positioning means for providing a superimpositioning of the images of said object contained in each of said beams and with said cross hair, and a calibrated screw means operatively connected to said positioning means to provide a direct correlation between the movement of said screw means and the instant setting of said positioning means.

9. A double image measuring device comprising a means for supporting an object having a plurality of marks thereon in the common symmetry plane of the device, means for orienting the object on said supporting means, means including a beam splitter disposed in said common symmetry plane for providing a pair of substantially symmetrical optical paths, means for focusing the images of the said marks from each optical path in a common focal plane and in a superimposed position therein, means for viewing the images at said focal plane, means to provide a proportional displacement of the beams of both of said optical paths whereby the images of the marks in the respective optical paths are brought into coincidence before said viewing means, and means movable in correlation with said displacement means for providing a measurement of the movement thereof.

References Cited in the file of this patent

UNITED STATES PATENTS

| | | |
|---|---|---|
| 2,549,566 | Bentley et al. | Apr. 17, 1951 |
| 2,709,944 | Marx | June 7, 1955 |